United States Patent
Lee et al.

(10) Patent No.: US 8,478,007 B2
(45) Date of Patent: Jul. 2, 2013

(54) METHOD FOR DETECTING GROUND GLASS OPACITY USING CHEST COMPUTED TOMOGRAPHY

(75) Inventors: Jeong Won Lee, Daejeon (KR); Jin Mo Goo, Seoul (KR); Soo Yeul Lee, Daejeon (KR); Ji Wook Jeong, Daejeon (KR); Seung Hwan Kim, Daejeon (KR); Done Sik Yoo, Daejeon (KR); Seon Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 848 days.

(21) Appl. No.: 12/566,905

(22) Filed: Sep. 25, 2009

(65) Prior Publication Data
US 2010/0150420 A1 Jun. 17, 2010

(30) Foreign Application Priority Data
Dec. 12, 2008 (KR) .................. 10-2008-0126616

(51) Int. Cl.
*G06K 9/00* (2006.01)
(52) U.S. Cl.
USPC .......................................... 382/128; 382/131
(58) Field of Classification Search
USPC ......................................... 382/128, 131, 133
See application file for complete search history.

(56) References Cited

U.S. PATENT DOCUMENTS
| | | | |
|---|---|---|---|
| 6,728,334 B1 | 4/2004 | Zhao | |
| 6,937,776 B2 * | 8/2005 | Li et al. | 382/260 |
| 7,499,578 B2 * | 3/2009 | Reeves et al. | 382/131 |
| 2005/0063579 A1 | 3/2005 | Lee et al. | |
| 2007/0098242 A1 | 5/2007 | Wiemker et al. | |

FOREIGN PATENT DOCUMENTS
| | | |
|---|---|---|
| WO | 2005/112769 A1 | 12/2005 |
| WO | 2005/114566 A2 | 12/2005 |

OTHER PUBLICATIONS

Jeong Won Lee, et al; "The GGO Lesions Detected by Computer-Aided Detection System on Chest MDCT Images", Proceedings of the 28th IEEE EMBS Annual International Conference, New York City, USA, Aug. 30-Sep. 3, 2006, pp. 1983-1985.*

Jinghao Zhou, et al; "Automatic Detection and Segmentation of Ground Glass Opacity Nodules", Medical Image Computing and Computer-Assisted Intervention—MICCAI 2006, pp. 784-791, Sep. 28, 2006.*

Jeong Won Lee, et al; "The GGO Lesions Detected by Computer-Aided Detection System on Chest MDCT Images", Proceedings of the 28th IEEE EMBS Annual International Conference, New York City, USA, Aug. 30-Sep. 3, 2006, pp. 1983-1985.

(Continued)

*Primary Examiner* — Michelle Le
(74) *Attorney, Agent, or Firm* — Ladas & Parry LLP

(57) ABSTRACT

There is provided a method for detecting Ground Glass Opacity (GGO) using chest computed tomography. The method includes detecting a candidate cell having a brightness value within a detection range by sequentially scanning a three-dimensional image of a pulmonary region, and designating the candidate cell as a seed cell when surrounding cells of the candidate cell have brightness values within the detection range; when a plurality of seed cells are obtained by the designating of the candidate cell as a seed cell, grouping adjacent seed cells to obtain one or more candidate zones; and detecting one or more zones, which have a greater size than a GGO detection size and including therein more than the detection reference number of seed cells, out of the one or more candidate zones, and setting the detected one or more zones as one or more GGO candidates.

11 Claims, 4 Drawing Sheets

OTHER PUBLICATIONS

Kwang Gi Kim, MS, et al; "Computer-aided Diagnosis of Localized Ground-Glass Opacity in the Lung at CT: Initial Experience[1]", Radiology, Published on-line Sep. 28, 2005, vol. 236, Issue 2, pp. 657-661.

* cited by examiner

METHOD FOR DETECTING GROUND GLASS OPACITY USING CHEST COMPUTED TOMOGRAPHY

CROSS-REFERENCE TO RELATED APPLICATIONS

This application claims the priority of Korean Patent Application No. 10-2008-126616 filed on Dec. 12, 2008, in the Korean Intellectual Property Office, the disclosure of which is incorporated herein by reference.

BACKGROUND OF THE INVENTION

1. Field of the Invention

The present invention relates to a method for automatically detecting abnormal pulmonary signs in a chest Computed Tomography (hereinafter, referred to as 'CT') image, and more particularly, to a method for detecting Ground Glass Opacity (hereinafter, referred to as 'GGO') using chest computed tomography, which is able to more accurately detect GGO candidates that show an unclear boundary with the peripheral background and have a low brightness value and a coarse structure as well.

2. Description of the Related Art

Abnormal pulmonary signs that may be detected from chest CT images are largely divided into two groups: pulmonary nodule and GGO.

A pulmonary nodule is referred to as opacity that shows a clear boundary with a normal pulmonary region and has a high CT value. However, GGO is referred to as opacity that shows an unclear boundary with a normal pulmonary region and has a relatively low CT value and a coarse structure.

As a result, the pulmonary nodule is easily discriminated from its peripheral background, but the GGO is not easily discriminated from its peripheral background. Based on these characteristics, computer-aided diagnosis (CAD) programs used to automatically detect a pulmonary nodule have been developed and commercially available. However, a CAD program for automatically detecting GGO is not realized.

In particular, when a CAD program for detecting a pulmonary nodule is used to detect the GGO, too much noise is present in one or more GGO candidates, which lead to the low accuracy in the detection of GGO.

SUMMARY OF THE INVENTION

An aspect of the present invention provides a method for detecting GGO using chest computed tomography capable of detecting one or more GGO candidates in consideration of the unclear boundary with a pulmonary region and the relatively low CT value and enhancing the accuracy in the detection of the GGO by automatically detecting the outbreak of GGO, based on the GGO candidates.

According to an aspect of the present invention, there is provided a method for detecting ground glass opacity (GGO) candidates, the method comprising: detecting a candidate cell having a brightness value within a detection range by sequentially scanning a three-dimensional image of a pulmonary region, and designating the candidate cell as a seed cell when surrounding cells of the candidate cell have brightness values within the detection range; when a plurality of seed cells are obtained by the designating of the candidate cell as a seed cell, grouping adjacent seed cells to obtain one or more candidate zones; and detecting one or more zones, which have a greater size than a GGO detection size and including therein more than the detection reference number of seed cells, out of the one or more candidate zones, and setting the detected one or more zones as one or more GGO candidates.

In this case, the detection range is a range of computed tomography (CT) values between −800 HU and −200 HU.

In this case, the surrounding cells are disposed apart from the candidate cell at a predetermined distance.

In this case, the distance between the candidate cell and the surrounding cells, the GGO detection size, and the detection reference number are varied according to the resolution of the detected GGO candidates and the characteristics of the detected GGO.

According to another aspect of the present invention, there is provided a method for detecting ground glass opacity (GGO), comprising: extracting a pulmonary region from a chest computed tomography (CT) image and then editing the pulmonary region into a three-dimensional image; detecting a GGO candidate by sequentially scanning the three-dimensional image; and analyzing the GGO candidates to determine whether or not GGO occurs and report the occurrence of GGO, wherein the detecting of the GGO candidate comprises: detecting a candidate cell having a brightness value within a detection range by sequentially scanning a three-dimensional image of a pulmonary region, and designating the candidate cell as a seed cell when surrounding cells of the candidate cell have brightness values within the detection range; when a plurality of seed cells are obtained by the designating of the candidate cell as a seed cell, grouping adjacent seed cells to obtain one or more candidate zones; and detecting one or more zones, which have a greater size than a GGO detection size and including therein more than the detection reference number of seed cells, out of the one or more candidate zones, and setting the detected one or more zones as one or more GGO candidates.

In this case, the detection range is a range of CT values between −800 HU to −200 HU.

In this case, the surrounding cells are disposed apart from the candidate cell at a predetermined distance.

In this case, the distance between the candidate cell and the surrounding cells, the GGO detection size, and the detection reference number are varied according to the resolution of the detected GGO candidates and the characteristics of the detected GGO.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
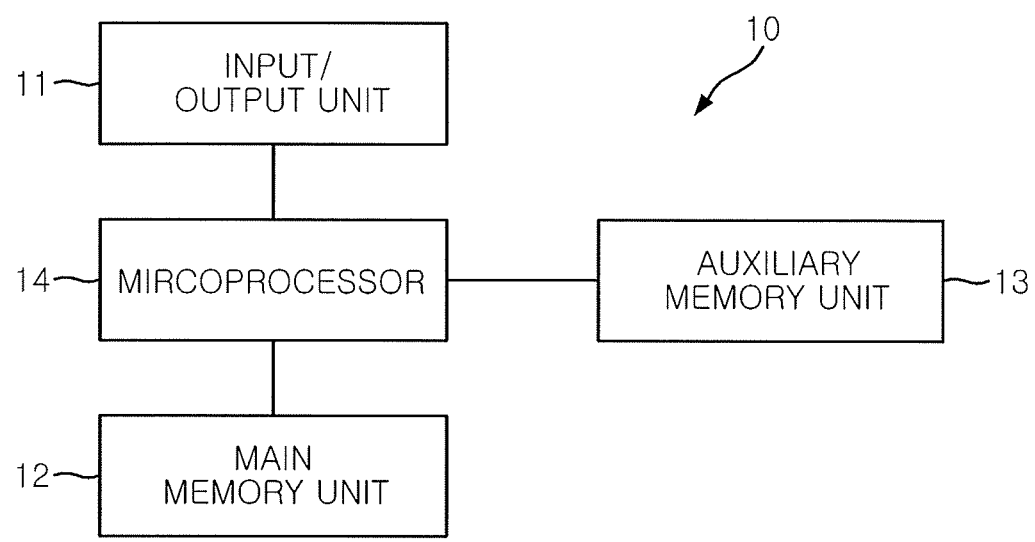
FIG. 1 is a perspective view illustrating a hardware system used in the present invention.

Exemplary embodiments of the present invention, which may be easily put into practice by those skilled in the art to which the present invention, will now be described in detail with reference to the accompanying drawings. For the exemplary embodiments of the present invention, however, detailed descriptions of known functions and constructions that are related to the present invention are omitted for clarity when they are unnecessarily proven to makes the gist of the present invention unnecessarily unclear.

Also in the accompanying drawings, parts unrelated with the above-mentioned descriptions are omitted to clearly describe the exemplary embodiments of the present invention, and the same components in the drawings have the same reference numerals throughout the specification of the present invention.

Also, when a certain part "includes" a certain component, this means that the certain part does not exclude other components but may contain other components, unless otherwise expressly stated.

FIG. 1 is a perspective view illustrating a hardware system used in the present invention.

Referring to FIG. 1, the hardware system 10 used in the present invention includes an input/output unit 11 inputting/outputting chest CT image data that external users require to automatically detect GGO; main/auxiliary memory units 12 and 13 storing a variety of data that are required in a process of detecting GGO using chest CT images; and a microprocessor 14 performing a general arithmetic operation to control the main/auxiliary memory units 12 and 13 and the input/output unit 11 and to detect GGO using chest CT images.

Preferably, the input/output unit 11 includes a monitor, a printer, and the like.

The above-mentioned hardware system 10 is used to perform the method for detecting GGO according to an exemplary embodiment of the present invention using chest CT images. In this case, when a CAD program comprising a process of the hardware system of FIG. 1, as described later, is performed by inputting chest CT images to the CAD program which is installed inside the microprocessor 14, the CAD program uses the chest CT images to automatically detect the GGO.

Figure 2:
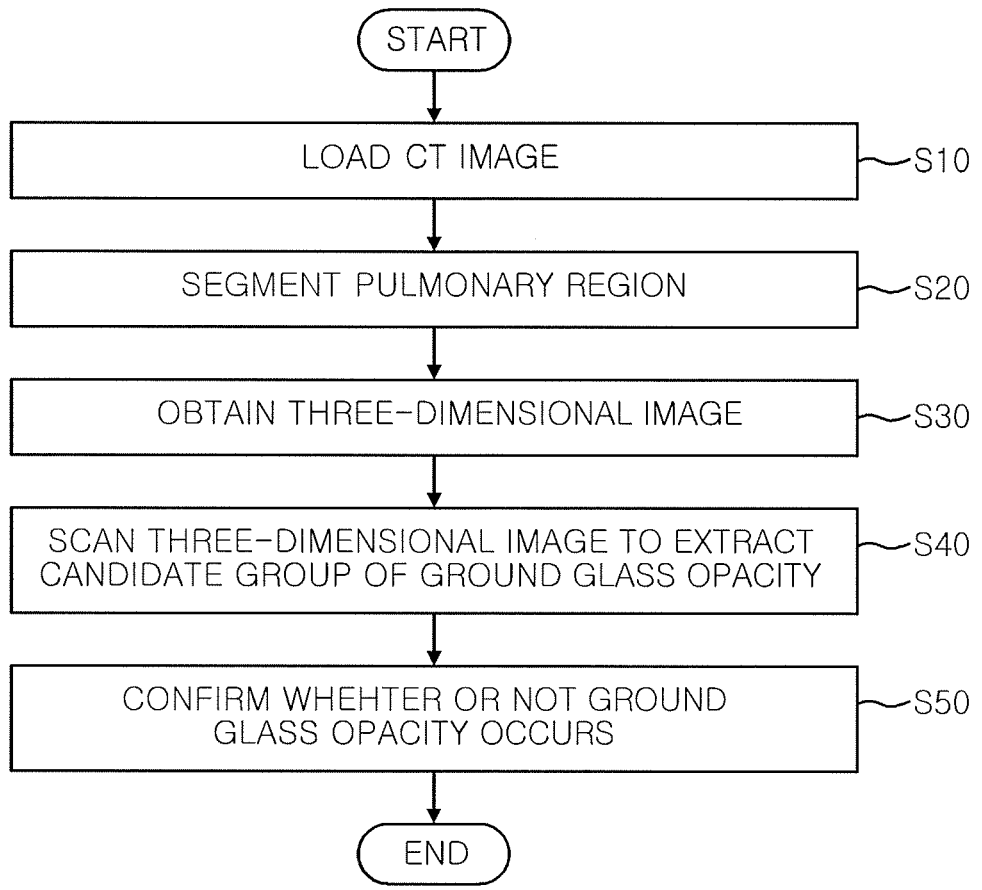
FIG. 2 is a schematic flowchart illustrating a method for detecting GGO using chest CT images according to an exemplary embodiment of the present invention.

FIG. 2 is a schematic flowchart illustrating a method for detecting GGO using chest CT images according to an exemplary embodiment of the present invention.

Referring to FIG. 2, in accordance with an exemplary embodiment of the present invention, a chest image of a user who wants to automatically detect GGO is taken with a CT to obtain chest CT images (S10).

For reference, the chest CT images have a relatively higher resolution as its slices are decreased in thickness and its reconstruction intervals get narrower. As one example of the multi-slice CT image, it is possible to obtain chest CT images with a slice thickness of 2 mm and a reconstruction interval of 1 mm.

Such chest CT images are directly digitalized in an imaging apparatus and stored and transmitted in a medical image standard file format called digital imaging and communications in medicine (DICOM). An image file has 512×512 pixels, and each pixel is composed of 12 bits (4096 grey levels), and a header of the medical image standard file format (DICOM) includes information on patients and conditions at the time of photography, and thus may be used to calculate a feature value in analyzing the chest CT images.

Next, pulmonary regions are segmented from the chest CT images (S20).

Then, 2D sectional images of the extracted pulmonary region are re-constructed to obtain a 3D (three-dimensional) image of the pulmonary region (S30), and one or more GGO candidates are repeatedly detected while sequentially scanning the entire zone of the 3D image of the pulmonary region (S40).

Finally, a 3D feature value analysis algorithm is used to analyze each GGO candidate, confirm whether GGO is detected, and inform users of the detection of the GGO (S50).

For reference, the grey-level values in the CT image are represented by hounsfield units (HU). Here, the HU of the CT image is generally in the range of −1024 to +3072.

In particular, since the inner parts of the lungs are filled with air, the inner parts of the lungs have a lower brightness value than the soft tissues surrounding the lungs and other organs, while a region where GGO occurs has a relatively higher brightness value than the normal pulmonary regions.

In general, the normal parts of the lungs have a brightness value ranging from −900 HU to −700 HU, and a region where GGO occurs has a brightness value ranging from −600 HU to −400 HU.

Figure 3:
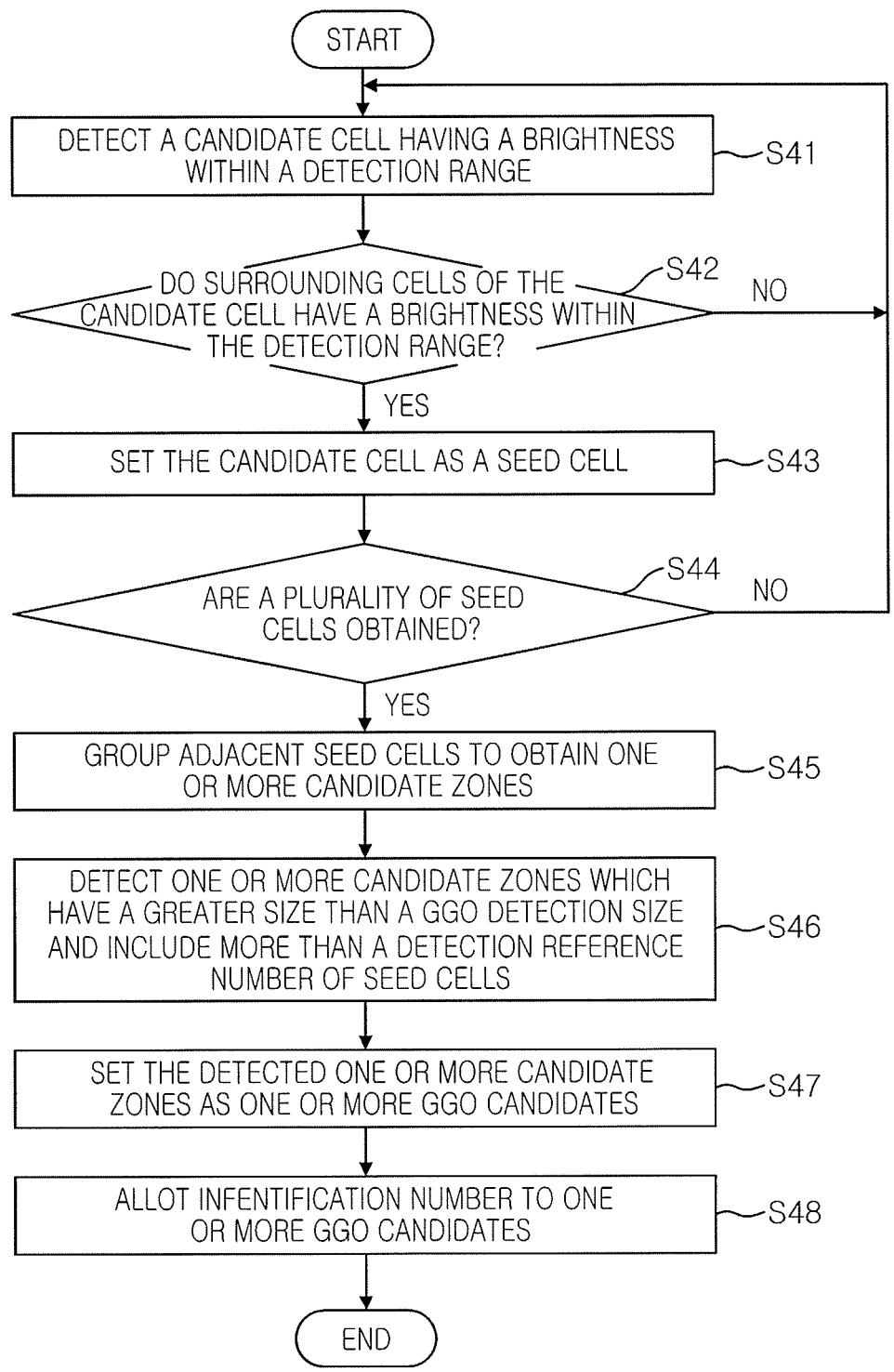
FIG. 3 is a flowchart illustrating a more detailed process of detecting GGO candidates according to an exemplary embodiment of the present invention.

FIG. 3 is a flowchart illustrating a more detailed process (S40 of FIG. 2) of detecting one or more GGO candidates according to an exemplary embodiment of the present invention.

In the exemplary embodiment of the invention, for convenience of description, the range of −800 HU to −200 HU, which is wider than that of brightness values of a region where GGO occurs, is set to a detection range in due consideration of a tolerance error. In addition, considering the coarse structure of GGO, cells disposed apart from a candidate cell by 2 pixels in the X, Y and Z directions are determined to be surrounding cells.

Referring to FIG. 3, a candidate cell 20 having a brightness value within a detection range (i.e., a brightness-value range between −800 HU and −200 HU) is detected with a grey-level threshold technique while sequentially scanning the entire zone of the 3D image of the pulmonary region (S41).

Figure 4:
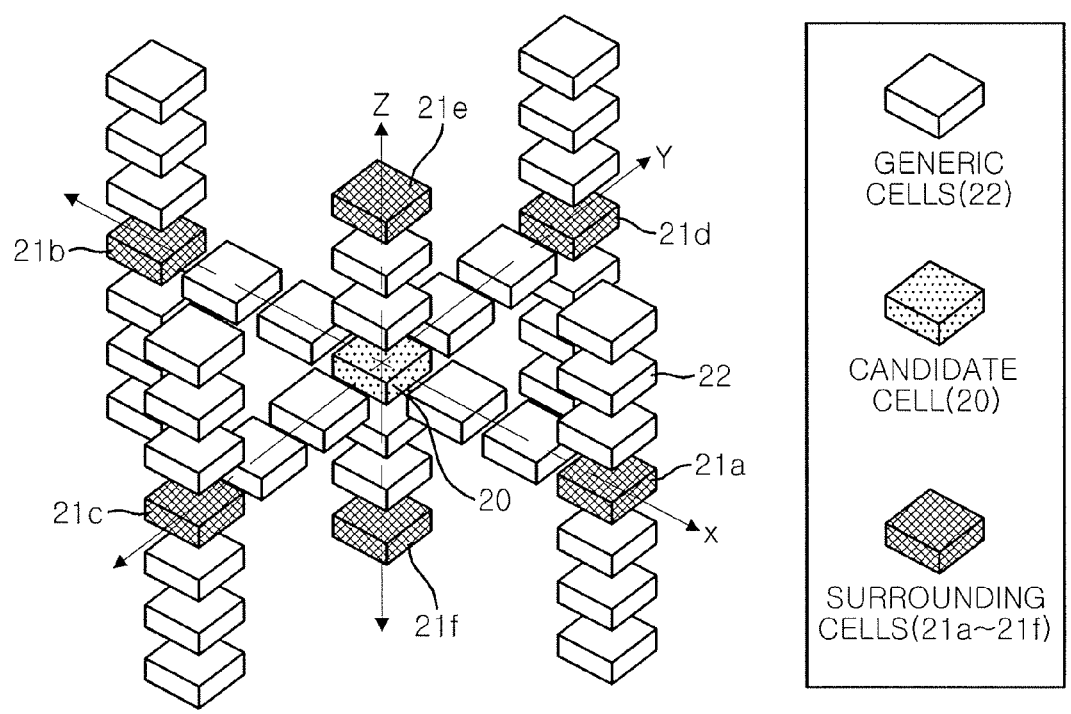
FIG. 4 is a diagram illustrating one example of candidate cell set up as a seed cell according to an exemplary embodiment of the present invention.

When the candidate cell 20, as shown in FIG. 4, is detected in Operation S41, it is determined whether or not surrounding cells 21a to 21f disposed apart at a predetermined distance (i.e., by 2 pixels in the X, Y and Z directions) from the candidate cell 20 have the same brightness value (i.e., the brightness values within the detection range) as that of the candidate cell 20 (S42).

As the results of Operation S42, if the surrounding cells 21a to 21f have the brightness values within the detection range, the candidate cell 20 detected in Operation S41 is set as a seed cell (S43).

Operations S42 to S44 are performed repeatedly until the entire zone of the three-dimensional image of the pulmonary region is scanned. When a plurality of seed cells are obtained by above repeat operation (S44), the plurality of seed cells are grouped according to the locations of the seed cells in order to obtain one or more candidate zones (S45).

Then, each of the candidate zones is analyzed. When there is a candidate zone having a greater size than a GGO detection size and including therein more than the detection reference number of seed cells (S46).

The detected one or more candidate zones are set as one or more GGO candidate (S47), and endowed with an identification number (S48).

The GGO detection size may be set to the minimum size (for example, 30 mm$^3$) by which the medical group currently determines the occurrence of GGO. The detection reference number may be set to the number of voxels contained in the minimum size of GGO.

In addition, in order to more accurately detect GGO candidates having various kinds and characteristics, according to the present invention, the detection range, the distance between the candidate cell and surrounding cells, the GGO detection size and the detection reference number may be arbitrarily set and varied, prior to the detection of the GGO candidates as shown in FIG. 3. That is, the parameter for detecting GGO candidate may be set and varied freely according to the resolution of GGO candidate detection and the detection characteristics of GGO.

FIG. 4 is a diagram illustrating one example of candidate cell 20 set up as seed cells according to an exemplary embodiment of the present invention.

Referring to FIG. 4, it is revealed that the 3D image of the pulmonary region may be obtained by sequentially disposing and recombining 2D images of the pulmonary region. FIG. 4 does not show cells except for the cells present in the X, Y and Z axes of the candidate cell 20 in order to easily discriminate the candidate cell 20 from its surrounding cells 21a to 21f.

Referring to FIG. 4, when the candidate cell 20 having the brightness value within the detection range is detected from the 3D image of the pulmonary region, the cells disposed apart at the predetermined distance (for example, 2 pixels in directions X, Y and Z) from the candidate cell 20 are obtained as the surrounding cells 21a to 21f, considering that the GGO itself has a relatively coarse structure.

Then, when the surrounding cells have the brightness value within the detection range, the candidate cell 20 disposed in the center of the surrounding cells is designated as the seed cell.

As described above, according to the present invention, the detection range is set to such a level that they correspond to the brightness value of the GGO, and the conditions used to obtain the surrounding cells 21a to 21f are set, considering that the GGO has a coarse structure.

That is, GGO candidates may be detected more accurately by adjusting the setting conditions of the seed cells to sufficiently reflect GGO characteristics.

The above-mentioned method for detecting GGO, according to an exemplary embodiment of the present invention, may be realized by a program that may be provided by computer-readable recording media. Also, the recording media may be performed by microprocessors. Thus, the present invention may be more easily put into practice by performing the method of the present invention by the microprocessor 14 installed inside the system 10 as shown in FIG. 1.

The recording media include storage media such as magnetic recording media (i.e., floppy disks, hard discs, and the like), optical recording media (i.e., CD-ROM, DVD, and the like), and carrier waves (i.e., transmission via the internet).

The recording media has a program recorded therein. In this case, the program includes a first program module obtaining chest CT images; a second program module extracting a pulmonary region from the chest CT images; a third program module reconstructing 2D sectional images of the pulmonary region to obtain a 3D image; a fourth program module extracting GGO candidates while scanning the entire zone of the 3D image as shown in FIG. 3; and a fifth program module analyzing 3D feature values of the GGO candidates to determine whether or not there is GGO in the GGO candidates.

In this case, the fourth program module includes a first subprogram module detecting a candidate cell having a brightness value within a detection range by sequentially scanning a three-dimensional image of a pulmonary region, and designating the candidate cell as a seed cell when surrounding cells of the candidate cell have brightness values within the detection range; a second subprogram module, when a plurality of seed cells are obtained by the designating of the candidate cell as a seed cell, grouping adjacent seed cells to obtain one or more candidate zones; and a third subprogram module detecting one or more zones, which have a greater size than a GGO detection size and including therein more than the detection reference number of seed cells, out of the one or more candidate zones, and setting the detected one or more zones as one or more GGO candidates.

Here, functional program codes and code segments, which are actually obtained by encoding each of the program modules and the subprogram modules, may be easily made out by programmers skilled in the art to which the present invention belongs.

As described above, the method for detecting GGO using chest computed tomography, according to an exemplary embodiment of the present invention, may be useful to more accurately detect GGO candidates that are represented by opacity that has a relatively lower brightness value than that of a pulmonary nodule, shows an unclear boundary with a normal pulmonary region and has a coarse structure and to automatically detect the actual occurrence of GGO based on GGO candidates. Accordingly, the method according to an exemplary embodiment of the present invention may be useful to automatically detect GGO using chest computed tomography and to secure reliability in the detection of GGO as well.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus that detects ground glass opacity (GGO) candidates, comprising:
  a computer system comprising a processor and a memory;
  a memory unit operating on the computer system and adapted to:
  detect a candidate cell having a brightness value within a detection range by sequentially scanning a three-dimensional image of a pulmonary region,
  designate the candidate cell as a seed cell when surrounding cells of the candidate cell have brightness values within the detection range, and
  when a plurality of seed cells are obtained by the designating of the candidate cell as a seed cell, group adjacent seed cells to obtain one or more candidate zones, and
  detect one or more zones out of the one or more candidate zones, and set the detected one or more zones as one or more GGO candidates.

2. The apparatus of claim 1, wherein the detection range is a range of computed tomography (CT) values between −800 HU and −200 HU.

3. The apparatus of claim 1, wherein the surrounding cells are disposed apart from the candidate cell at a predetermined distance.

4. The apparatus of claim 1, wherein a distance between the candidate cell and the surrounding cells, a GGO detection size, and a detection reference number are varied according to a resolution of the one or more GGO candidates and characteristics of the one or more GGO candidates.

5. The apparatus of claim 1, wherein the memory unit is further adapted to allot identification information to the one or more GGO candidates.

6. An apparatus that detects ground glass opacity (GGO), comprising:
  a computer system comprising a processor and a memory;
  a memory unit operating on the computer system and adapted to:

extract a pulmonary region from a chest computed tomography (CT) image and then edit the pulmonary region into a three-dimensional image, detect a GGO candidate by sequentially scanning the three-dimensional image, and analyze the GGO candidate to determine and report whether or not GGO occurs, wherein the detecting of the GGO candidate comprises:

detecting a candidate cell having a brightness value within a detection range by sequentially scanning the three-dimensional image of the pulmonary region, and designating the detected candidate cell as a seed cell when surrounding cells of the candidate cell have brightness values within the detection range, and;

when a plurality of seed cells are obtained by the designating of the candidate cell as a seed cell, grouping adjacent seed cells to obtain one or more candidate zones, and detecting one or more zones out of the one or more candidate zones, and setting the detected one or more zones as one or more GGO candidates.

7. The apparatus of claim 6, wherein the detection range is a range of CT values between −800 HU to −200 HU.

8. The apparatus of claim 6, wherein the surrounding cells are disposed apart from the candidate cell at a predetermined distance.

9. The apparatus of claim 6, wherein a distance between the candidate cell and the surrounding cells, a GGO detection size, and a detection reference number are varied according to a resolution of the one or more GGO candidates and characteristics of the one or more GGO candidates.

10. A non-transitory computer readable storage medium having processor executable instructions to:

detect a candidate cell having a brightness value within a detection range of CT values between −800 HU to −200 HU by sequentially scanning a three-dimensional image of a pulmonary region, and designating the candidate cell as a seed cell when surrounding cells of the candidate cell have brightness values within the detection range;

obtain a plurality of seed cells by the designating of the candidate cell as a seed cell;

group adjacent seed cells to obtain one or more candidate zones; and detect one or more zones, which have a greater size than a GGO detection size, out of the one or more candidate zones, and set the detected one or more zones as one or more GGO candidates.

11. The apparatus of claim 1 wherein each of the one or more zones is larger than 30 mm$^2$.

* * * * *